July 19, 1960 G. P. GRANT, JR 2,945,429
PHOTOGRAPHIC FILM DEVELOPING APPARATUS
Filed Dec. 28, 1956 4 Sheets-Sheet 1

*INVENTOR.*
GARNET PETER GRANT, JR.
BY
ATTORNEY

July 19, 1960 G. P. GRANT, JR 2,945,429
PHOTOGRAPHIC FILM DEVELOPING APPARATUS
Filed Dec. 28, 1956 4 Sheets-Sheet 2

INVENTOR.
GARNET PETER GRANT, JR.
BY Albert F. Kronman
ATTORNEY

July 19, 1960   G. P. GRANT, JR   2,945,429
PHOTOGRAPHIC FILM DEVELOPING APPARATUS
Filed Dec. 28, 1956   4 Sheets-Sheet 3

INVENTOR.
GARNET PETER GRANT, JR.
BY
ATTORNEY

July 19, 1960

G. P. GRANT, JR 2,945,429

PHOTOGRAPHIC FILM DEVELOPING APPARATUS

Filed Dec. 28, 1956

INVENTOR.
GARNET PETER GRANT, JR.

BY Albert T. Kronman

ATTORNEY

United States Patent Office 2,945,429
Patented July 19, 1960

2,945,429

PHOTOGRAPHIC FILM DEVELOPING APPARATUS

Garnet Peter Grant, Jr., Cleveland, Ohio, assignor to Grant Photo Products Incorporated, Cleveland, Ohio, a corporation of Delaware Filed Dec. 28, 1956, Ser. No. 631,330

7 Claims. (Cl. 95—94)

This invention relates to a developing apparatus for a long continuous photographic tape such as those used in oscillograph recorders. It has special reference to a speed control means which accepts the tape from the oscillograph recorder and processes the tape at the same speed as delivered from the oscillograph. The invention also relates to a control means which retains the tape in one or more processing tanks for a predetermined length of time, regardless of the speed through the apparatus.

Continuous developers for long lengths of photographic tape are well-known in the art and have been used for many years. However, all of the known types of continuous developers operate at a set speed which is determined by the characteristics of the paper, the light exposure, and the strength of the developing solutions.

It is common usage to expose the photographic tape in an oscillograph and rewind it onto a spool; the spool is then transferred to a processor and threaded therein so that the last exposed end becomes the beginning end of the roll coming out of the processor.

If such a processor is connected directly to the oscillograph with the photographic tape threaded through both, then the tape speed of the oscillograph must be limited to that speed required by the processor for complete development.

Oscillographs are operated at tape speeds of one-tenth of one inch per second to 100 inches per second and more with frequent changes in the tape speed during exposure of a roll of photographic tape.

While it is possible to place a mechanical accumulator or dry storage cabinet between the oscillograph and the processor, it is not practical to do so because such an accumulator can hold only a very limited footage. Nor can the processor be easily adjusted to faster and slower developing speeds because faster speeds require deeper tanks and longer lengths of photographic tape threaded in the solutions to provide the same immersion time, etc.

Yet it is the purpose of this invention to describe a processor which will provide for fixed immersion times in solutions to photographic tape entering the processor at variable irrelevant speeds. The present invention accepts the tape at the same speed as it is delivered from the exposing device, such speeds being variable over a wide range of values. The tape is immediately immersed in a chemical solution at a given rate of travel and is withdrawn from the solution at this same speed. The controls which govern the speeds are arranged to retain the tape in each chemical solution for the same length of time regardless of the speed of transit. This is accomplished by altering the relationship between the entrance and exit mechanisms so that a variable length of tape is in each solution. The details of this arrangement will hereinafter be explained more fully.

One of the objects of this invention is to provide an improved developing apparatus which avoids one or more of the disadvantages and limitations of prior art arrangements.

Another object of the invention is to provide a developing apparatus which produces a chemically processed photographic tape a short time after exposure regardless of the speed of the tape.

Another object of the invention is to control the speed of a developing apparatus so that the entrance speed to the developing tanks exactly matches the speed of the tape as it is delivered from the exposure device.

Another object of this invention is to provide a developing apparatus having a very wide range of photographic paper transport speeds.

Still another object of this invention is to provide a developing processor which can be coupled to an oscillograph to process photographic tape immediately and automatically.

Still another object of this invention is to provide a developing processor having a fast transport speed yet requiring a minimum leader length for threading or for "wasting" in the event the machine is stopped while still threaded.

Another object of the invention is the provision of a control device which retains the tape in each of a plurality of processing tanks the exact length of time necessary for the chemical process regardless of the speed of the tape entering the tank.

Another object of the invention is to provide liquid spray means within the tanks so that the tape receives the full benefit of the liquid chemical and yet is directed to a folded position within the tank.

A further object of the invention is to provide a roller conveying means within each tank which operates in a cyclic manner to direct the tape to a folded position.

Another object of the invention is to provide a plurality of paddles within each tank to assist in agitating the solution and retain the tape in its folded position.

An object of the invention is to provide a system of rollers which will direct a prefolded tape into and out of a chemical processing tank with means for permitting the tape to assume its prefolded condition inside the tank.

One feature of the invention includes a plurality of tanks each of which contains a liquid media which chemically processes the tape. A roller conveyor means moves the tape through the tanks and a power means, such as an electric motor, is coupled to each roller means to drive one or more rollers in contact with the tape. Control means are provided for each of said power means in order to control the speed of the rollers and the length of tape in each tank whereby each portion of the tape is retained in each tank for a definite predetermined length of time.

For a better understanding of the present invention, together with other and further objects thereof, reference is made to the following description taken in connection with the accompanying drawings.

Figure 1:
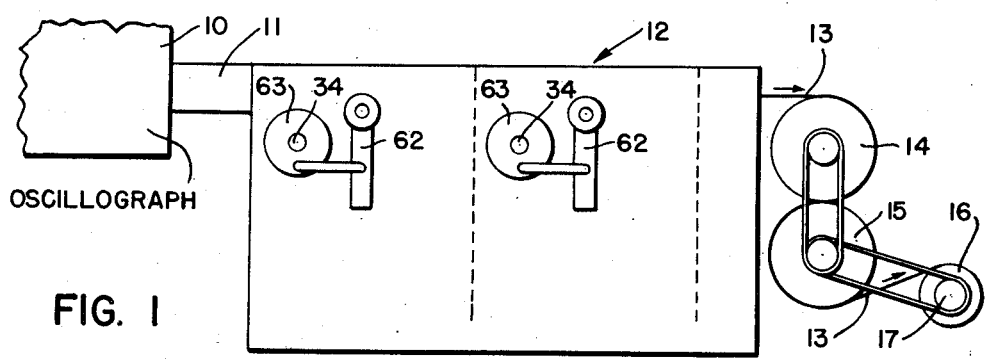
Fig. 1 is a side diagrammatic view of the developing apparatus showing its connection with an oscillograph and drying and storage rolls.

Referring now to the drawings, Fig. 1 shows an oscillograph 10 with a connecting box 11 which guides a tape 13 from the oscillograph to a plurality of tanks 12. After the tape 13 leaves the tanks it is directed over two drying rolls 14 and 15 which absorb most of the solution carried by the tape and in addition heat the tape so that by the time the tape leaves roll 15 it is dry enough to be wound on a storage roll 16 which is driven by a slipping clutch device 17. Rolls, 14, 15, and 16 are driven by a mechnical sprocket wheel connected to the last motor which draws the tape from the last tank.

Figure 3:
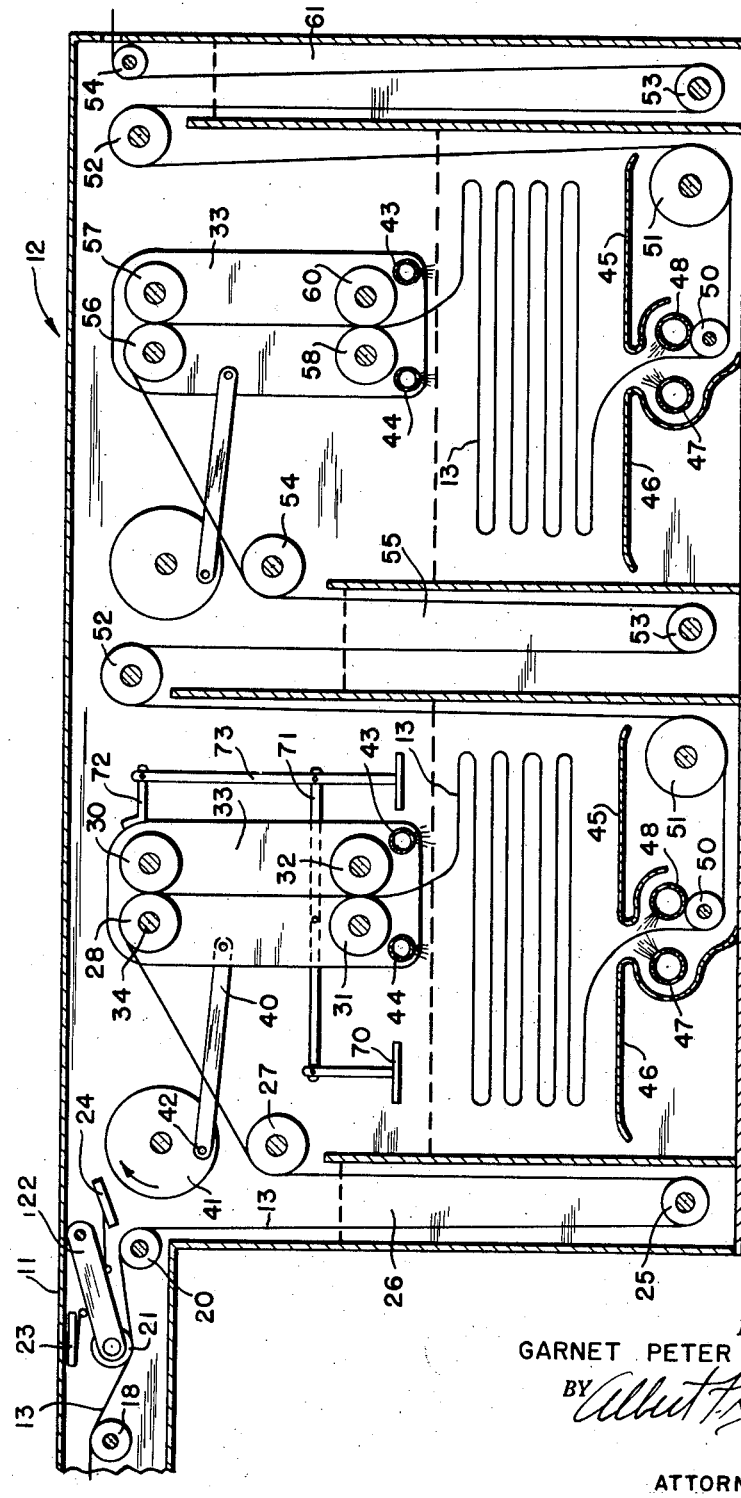
Fig. 3 is a cross sectional view taken through two of the tanks and shows one arrangement of the roller conveying means which deposits the tape in a folded position inside the tanks.
Figure 4:
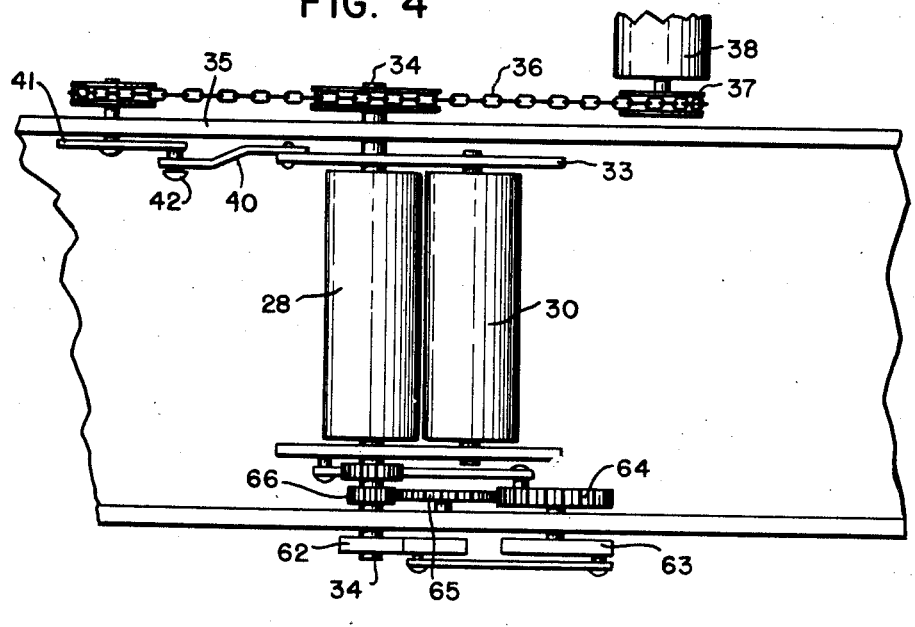
Fig. 4 is a top view of one of the tanks with the cover removed showing two of the rollers which direct the tape.

Referring now to Figs. 3 and 4, the tape 13 passes through the box 11 and is stretched between two idler rollers 18 and 20. Midway between these rollers a third roller 21 is mounted at the end of a rockable arm 22. Roller 21 senses the tension of the tape as it passes between rollers 18 and 20 and the position of roller 21 is determined by two microswitches 23 and 24. When there is no change in tension and the roller 21 and arm 22 assume an intermediate position, neither one of microswitches 23 nor 24 is operated. However, if the tape 13 as fed from the oscillograph has its speed lowered, arm 22 will sense an increased tension and switch 23 will be operated, thereby controlling the speed of a power means to reduce the speed of the roller conveyor means and restore the tension of the tape to normal. If the tape speed increases there will be less tension on the tape between rollers 18 and 20 and arm 22 will be lowered, thereby actuating switch 24 and producing an opposite change in speed.

After leaving roller 20, the tape 13 is conveyed over an idler roller 25 in a liquid 26 which may be pure water and designed only to wet the emulsion on the tape. The tape then passes over roller 27 and is then conveyed between power roller 28 and idler roller 30 and directed toward two similar rollers 31 and 32 which are mounted on a rockable base 33. The base 33 rocks about a shaft 34 to which is secured power roller 28. Shaft 34 extends through the side wall 35 of the developing tank and is turned by a chain 36 coupled to a sprocket 37 which is turned by an electric motor 38. It will be obvious that other mechanical coupling means may be employed between shaft 34 and motor 38. Also the driving means may be any power means which is capable of drawing the tape from the oscillograph.

Base 33 is connected to a short rod 40 and a power driven wheel 41 which contains an eccentric stub shaft 42 coupled to rod 40. Wheel 41 is turned by a coupling means secured to either shaft 34 or sprocket wheel 37 and when this wheel revolves, base 33 is given a rocking motion about shaft 34 which spreads film 13 in a folded position as shown in Fig. 3.

The number of folds in the first tank will vary considerably with the speed of the tape through the machine. If the speed is very slow only one or two folds will be necessary to store the tape for the required time to permit adequate development. If the speed is great there may be as many as twenty folds in the tank in order to permit each increment of tape to remain in the chemical solution for the required length of time.

As the tape 13 is deposited in the tank the positioning of the folds is aided by jets of developer solution which emanate from small pipes 43 and 44 secured to base 33 and moving with it. These jets of spray are produced by a rotary pump (not shown) which picks up the developer from a lower portion of the tank and delivers it through a flexible tube to the pipes 43, 44, on the base 33.

At the bottom of the tank two separators 45 and 46 keep the tape folds from settling to the base of the tank and two other pipes 47 and 48 discharge developer solution in the direction indicated to keep the tape folds free and clear of all mechanical obstructions.

The tape is withdrawn from the tank by passing it over idler rollers 50, 51, 52, 53, and 54; this system conveying the tape through a third bath 55 which may be a stop bath, stopping the developer action. The tape 13 is them conveyed over a power roller 56 which, in conjunction with an idler roller 57 and rollers 58 and 60, serve to distribute the tape in a folded position in a second chemical bath which may be an acid fixing solution. The second tank includes pipes 43, 44, similar to the pipes in the first tank and also includes partitions 45 and 46 as in the first tank. Also, pipes 47 and 48 and idler rollers 50, 51, 52, 53, and 54, direct the tape out of the fixing solution through a rinsing bath 61 which may be pure water. The tape is then directed to a storage and drying means as shown in Fig. 1.

In order to balance the effects of the oscillation of plate 33, a weighted pendulum 62 is positioned on the outside of the tank as shown in Figs. 1 and 4. In this case the pendulum is driven by a wheel 63 which receives its power through a set of gears 64, 65, and 66, coupled to shaft 34 and driven by the power means 38. While the pendulum 62 balances the weight of rollers 31 and 32 it is not necessary for the operation of the device and may be eliminated if desired.

There may be times, especially when very stiff tape is being used, that additional means are considered necessary for aiding in the positioning of the tape in its folded position. Such an arrangement may consist of a system of paddles 70 secured by linkages 71, 72, and 73, to the base 33 and operated by it. When the base 33 moves in a clockwise direction as shown in Fig. 3 one of the paddles 70 moves downwardly to press the tape under the liquid surface and retain it for a moment in its folded position. On the return stroke the other paddle 70 is depressed and performs a similar function.

Figure 2:
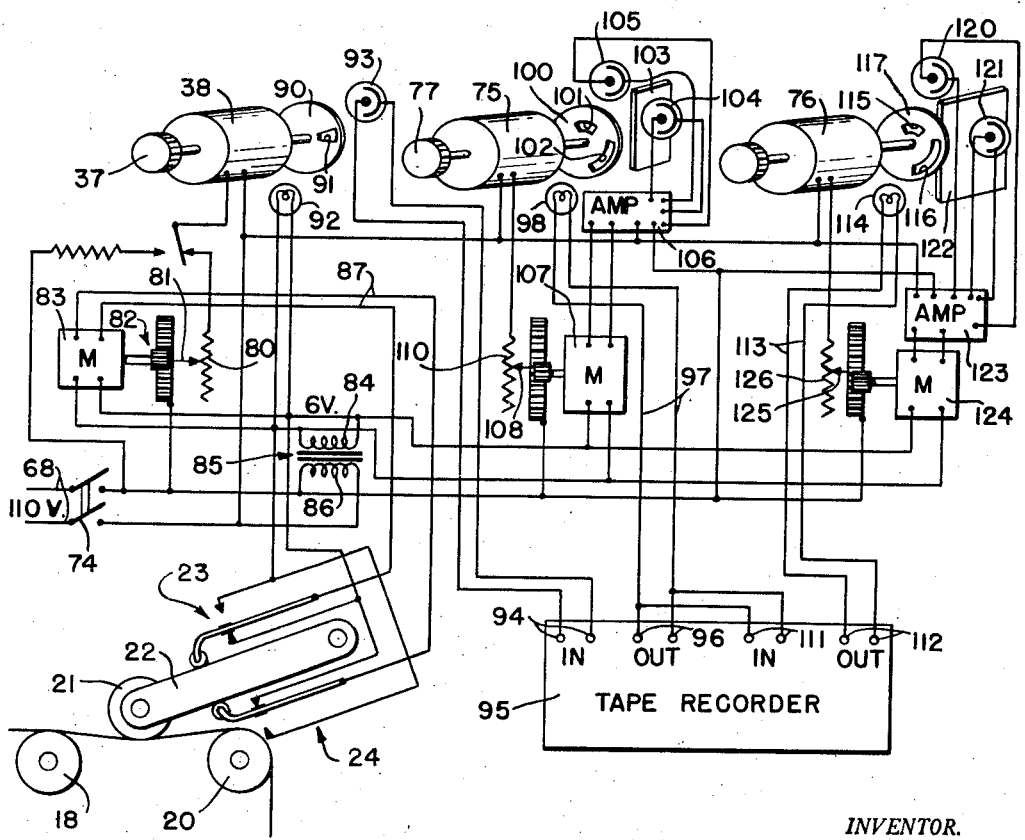
Fig. 2 is a schematic diagram of connections of the electrical controls.

Referring now to Fig. 2, the diagram of connections is shown for the complete circuit and includes idler gears 18 and 20, sensing roller 21 with its arm 22, and the microswitches 23 and 24.

Power for the electric circuit is derived from supply lines 68 which are connected by switch 74 and energize motors 38, 75, and 76. Motor 38 is coupled to roller means 28 by means of gear 37. Motor 75 is positioned adjacent to gear 77 and power roller 56 in the second tank. Motor 76 is positioned outside the tank and may be connected to either one of rolls 14 or 15 which pull the tape out of the tank and store it on roll 16.

The speed of the first motor 38 is controlled directly by a variable impedance 80 which is connected in series with motor 38 and the electric supply line 68. The variable impedance 80 may be a resistor with a sliding contact point 81 operated by coupling means 82 and a reversible motor 83. Motor 83 derives its field excitation from a six volt winding 84 on a transformer 85 having a primary winding 86 connected to switch 74. The armature of motor 83 is connected by means of conductors 87 to microswitches 23 and 24 as shown in Fig. 2, these switches controlling the direction of motor 83 which alters the impedance of element 80 and thereby controls the speed of motor 38 and the entrance speed of tape 13.

At the other end of motor 38 a disk 90 is mounted on the motor shaft having a wedge aperture 91. On one side of the disk a lamp 92 is mounted which is always lighted during the operation of the machine since it is connected directly to the six volt winding 84 of transformer 85. On the other side of mask 90 a photosensitive element 93 is mounted. This element may be a photoconductive cell or a photoelectric cell as symbolized in Fig. 2. The output of the photoelectric cell 93 is connected directly to the input terminals 94 of a tape recorder 95. This tape recorder includes the usual magnetic responsive tape which is run at constant speed, the details of this mechanism are well-known in the art and will not be described here. The tape recorder 95 comprises a magnetic input at one section of the tape and an output reading structure at another tape position so that the tape represents a predetermined time delay between the input and the output pulses. This time may be ten seconds if the photographic tape is scheduled to remain in the first tank for ten seconds.

The output of the tape recorder is taken from terminals 96 (after suitable amplification) and applied to conductors 97 and lamp 98 thereby producing flashes of light which are reproductions of the flashes of light received by photoelectric cell 93 but delayed by the delay time which in this case has been assumed to be ten seconds. The light pulses from lamp 98 are applied to a masked disk 100 secured to the end of the shaft of motor 75. This mask is constructed with two apertures 101 and 102 positioned at unequal distances from the center of the shaft rotation. On the other side of the mask a partition 103 is mounted in such a manner that light passing through aperture 102 shines on one side of the partition to actuate photoelectric cell 104, while light passing through aperture 101 is directed to the other side of the partition and actuates photoelectric cell 105. The light pulses received by cells 104 and 105 are amplified by amplifier 106 and applied to reversible motor 107, similar to reversible motor 83, and coupled to a contact point 108 which varies the resistance of resistor 110 in series with motor 75 and thereby controlling its speed.

The output of tape recorder 95 which was applied to terminals 96 is also applied to a second input set of terminals 111. The pulses received at these terminals are applied to a second tape, or a second portion of the first tape, and after a suitable time delay are taken from the tape and applied to output terminals 112. These pulses are transferred by conductors 113 to lamp 114 and shine through apertures 115 and 116 in mask 117 similar to mask 100. Mask 117 is secured to the shaft of motor 76 which operates a roller 14 to withdrawn the tape 13 from the second tank. Light pulses from lamp 114 are received by photoelectric cells 120 and 121 separated by partition 122, and after suitable amplification by amplifier 123 are applied to a reversible motor 124 which is coupled to a moving contact point 125 which operates to vary the resistance of resistor 126 and thereby control the speed of motor 76.

It will be obvious that motors 75 and 76 are controlled to turn at the same speed as motor 38 because the light flashes from lamp 92 through aperture 91 control the amount of light sent through apertures 101 and 102 in mask 100. If the light pulses transmitted by these apertures are of equal intensity the electric pulses transmitted from photoelectric cells 103 and 105 will be equal and motor 107 will not move, thereby stabilizing the resistance 110 in series with motor 75. If motor 75 alters its speed the light received by one of the cells 104 or 105 will be greater and motor 107 will then turn to adjust resistor 110 to bring the speed of motor 75 back to the same speed as motor 38. In a similar manner motor 76 is adjusted to have the same speed as motor 75. It should be pointed out, however, that the speed adjusting arrangement is delayed by the tape recorder for a predetermined number of seconds, this time being the calculated time for complete chemical processing in one of the tanks.

When this device is first put into operation the tape 13 is conveyed to the first tank and during this operation motor 38 is controlled by the tension sensing device to send the tape into the bath at the same speed with which it is received from the oscillograph. During this interval light pulses are transmitted through aperture 91 and received by the tape recorder and a predetermined time after the start of this operation light pulses are transmitted by lamp 98 through apertures 101 and 102 to photoelectric cells 104 and 105 thereby setting the speed of motor 75 which withdraws the tape from the first tank and conveys it to the second tank.

After a predetermined time delay the pulses admitted by lamp 98 are applied to lamp 114 and motor 76 is controlled, as described before, to turn at the same speed as motors 75 and 38 and withdraw the film over idler roller 54 to be stored on roll 16. It will be obvious from the above description that the time delay provided by the tape recorder will be equivalent to the retention time of the photographic tape in each tank.

The tape recorder for this application may be constructed with a continuous tape with an erasing magnet disposed just before the first input recorder.

Figure 5:
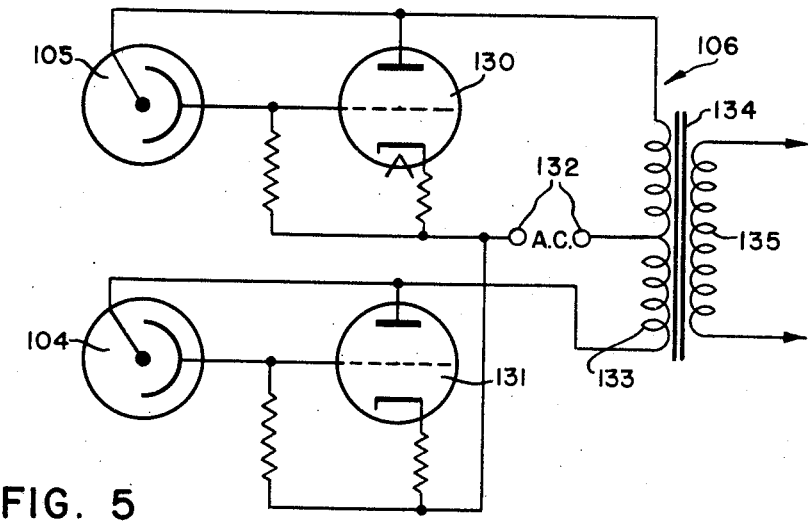
Fig. 5 is a schematic diagram of connections of two photoelectric cells which may be used in connection with the control means shown in Fig. 2.

The schematic diagram of connections shown in Fig. 5 represents a typical circuit which can be used to connect photoelectric cells 104, 105, to an amplifier circuit 106. The circuit includes triodes 130 and 131 connected to the cathodes of the respective photoelectric cells 103, 104. Alternating current is supplied at terminals 132 and the anodes of the triodes are connected in series with windings 133 of transformer 134, the secondary winding 135 being connected to motor 107. Similar connections are used between cells 120 and 121 and motor 124.

Figure 6:
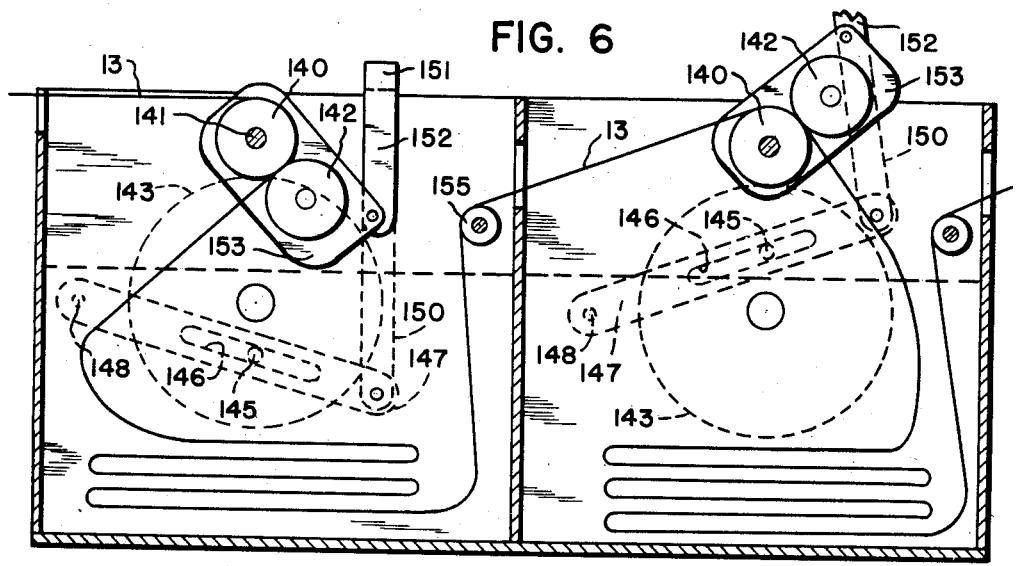
Fig. 6 is a cross sectional view of two of the tanks showing an alternate arrangement of the roller conveyor means which directs the tape to a folded position.

The cross sectional view of Fig. 6 illustrates an alternate means of directing the tape 13 to a folded position near the bottom of the tank. This arrangement comprises a power roller 140 in contact with the tape which is rotated by shaft 141, the tape being held in contact by idler roller 142. On the outside of the tank a large gear 143 meshes with a gear 144 secured to shaft 141 and is turned by it. Gear 143 includes a short eccentric stub shaft 145 which engages a slot 146 formed in a rockable lever 147. Lever 147 is pivoted by a short shaft 148 secured to the tank with its free end pivoted to a vertical rod 150. The upper end of rod 150 is fastened to a cross bar 151 which in turn is secured to a flat rod 152 extending downwardly on the inside of the tank and is pivoted to a base plate 153 on which is mounted the idler roller 142. In the operation of this device the lever 147 moves up and down as the power roller 140 revolves and plate 153 is rocked through an angle of more than ninety degrees to direct the tape 13 first to one side of the tank and then to the other side to position the tape in folds as indicated. The tape 13 is withdrawn from the tank over an idler roller 155.

Figure 7:
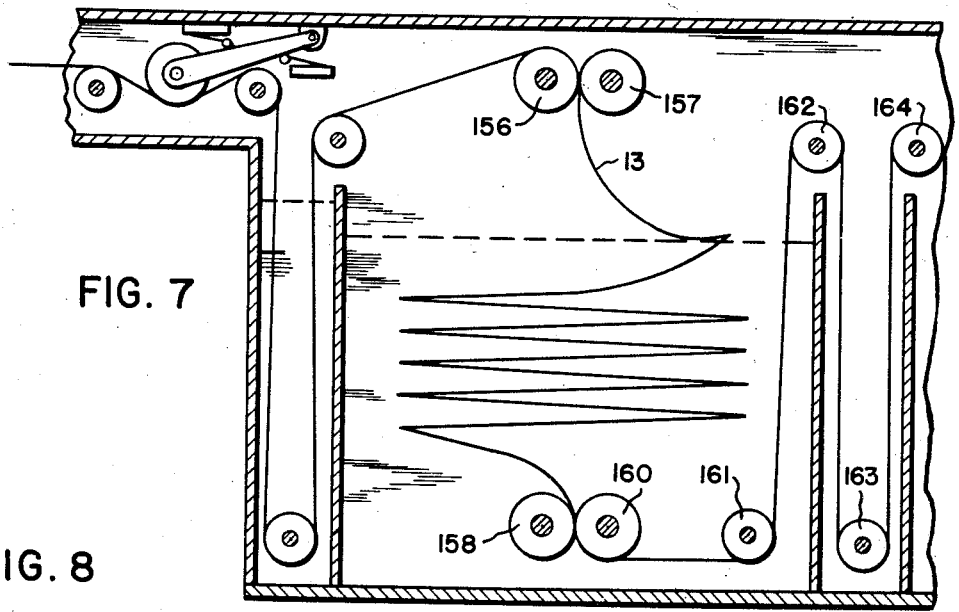
Fig. 7 is a cross sectional view of one of the tanks showing how a prefolded tape enters and leaves the tank.
Figure 8:
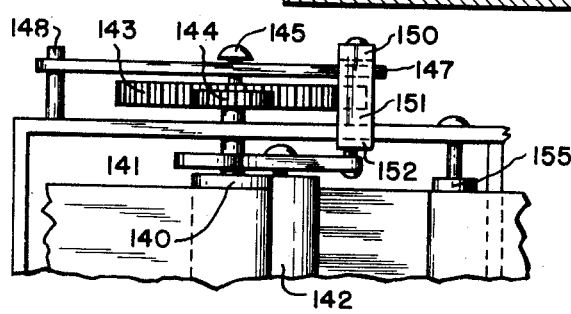
Fig. 8 is a partial top view of one of the tanks shown in Fig. 6, showing some of the details of the roller conveying means.

Fig. 7 shows an alternate type of construction which may be used only with prefolded tape. The directing means for this arrangement comprises a power roller 156 acting in conjunction with an idler roller 157. These two rollers impart a vertical downward direction to the tape and the natural prefolded construction causes the tape to resume the folded condition as shown in Fig. 7. The tape is withdrawn from the bottom of the tank by means of a power roller 158 and idler rollers 160, 161, 162, 163, and 164.

Having thus fully described the invention, what is claimed as new and desired to be secured by Letters Patent of the United States is:

1. A developing apparatus for photographic tape comprising, a tank which contains fluid media which chemically processes the tape, a first roller conveying means which moves the tape into the tank, a second roller conveying means which moves the tape out of the tank after being processed, a first and second power means coupled respectively to said first and second roller means for controlled rotation, a first control means associated with said first power means to control the speed of the tape into the tank at a delivered speed from external apparatus, a second control means associated with said second power means which controls both the speed of the tape out of the tank and the relative rotational position of said second conveying means with respect to the first conveying means, said second power means controlled to regulate the difference in speed into and out of the tank to change the length of tape in the tank whenever the delivered speed changes, said first and second power means controlled to retain any portion of the tape in the tank for a predetermined constant length of time.

2. A developing apparatus for photographic tape comprising, a tank which contains fluid media for chemically processing the tape, a first roller conveying means which moves the tape into the tank, a second roller conveying means which moves the tape out of the tank after being processed, a first and second controlled power means coupled respectively to the first and second conveying means for controlling the speed of the tape into the tank at a delivered speed from external apparatus and to control the speed of the tape out of the tank; said second controlled power means controlled by the delivered speed to regulate the difference in speed into and out of the tank to change the length of film in the tank whenever the delivered speed changes, whereby any portion of the tape is retained in the tank for a predetermined constant length of time.

3. A developing apparatus as set forth in claim 2 wherein a second tank contains similar first and second roller conveying means operated by similar first and second controlled power means to retain any portion of the tape in the second tank for a predetermined constant length of time.

4. A developing apparatus as set forth in claim 2 wherein said second controlled power means is coupled to a delay structure controlled by a speed responsive means on the first controlled power means to regulate the length of tape in the tank to vary in direct proportion to the delivered speed of the tape.

5. A developing apparatus for photographic tape comprising, a tank which contains fluid media which chemically processes the tape, a first roller conveyor means which moves the tape into the tank, a second roller conveyor means which moves the tape out of the tank after being procesesd, a first and second power means coupled respectively to said first and second roller means for controlled rotation, a first control means associated with said first power means to control the speed of the tape into the tank at a delivered speed from an external source, a second control means coupled to said second power means which controls the speed of the tape out of the tank and the relative position of said second conveying means to vary the length of the tape in the tank as the speed of the first roller conveyor is varied, said second means including a tape recorder which records generated pulses having a frequency proportional to the speed of the tape when entering the tank and delivers a series of pulses from said recorder to the second control means for controlling the speed of the second roller conveyor.

6. A developing apparatus for photographic tape as set forth in claim 5 wherein said first control means includes a switching means connected to a reversible electric motor for altering an impedance coupled to said first power means, said switching means actuated by the tension of the tape as it is delivered from said external source.

7. A developing apparatus for photographic tape as set forth in claim 6 wherein said second control means includes a speed control device which first adjusts the speed of the tape out of the tank until a predetermined length of tape is in the tank, and then adjusts the speed of the tank out of the tank to match the speed of the tape into the tank.

References Cited in the file of this patent

UNITED STATES PATENTS

| | | |
|---|---|---|
| 757,323 | Lienekampf et al. | Apr. 12, 1904 |
| 2,048,182 | Ybarrondo | July 21, 1936 |
| 2,143,147 | Ferris | Jan. 10, 1939 |
| 2,166,551 | Perry | July 18, 1939 |
| 2,797,918 | McArthur et al. | July 2, 1957 |

FOREIGN PATENTS

| | | |
|---|---|---|
| 16,327 | Great Britain | 1886 |
| 577,355 | Great Britain | May 15, 1946 |